United States Patent
Schockaert et al.

(10) Patent No.: US 12,535,782 B2
(45) Date of Patent: Jan. 27, 2026

(54) COMPUTER SYSTEM AND METHOD PROVIDING OPERATING INSTRUCTIONS FOR THERMAL CONTROL OF A BLAST FURNACE

(71) Applicant: PAUL WURTH S.A., Luxembourg (LU)

(72) Inventors: Cédric Schockaert, Waldbillig (LU); Fabrice Hansen, Doncols (LU); Lionel Hausemer, Itzig (LU); Maryam Baniasadi, Helmsange (LU); Philipp Bermes, Trier (DE)

(73) Assignee: PAUL WURTH S.A., Luxembourg (LU)

( * ) Notice: Subject to any disclaimer, the term of this patent is extended or adjusted under 35 U.S.C. 154(b) by 378 days.

(21) Appl. No.: 18/027,184

(22) PCT Filed: Sep. 28, 2021

(86) PCT No.: PCT/EP2021/076710
§ 371 (c)(1),
(2) Date: Mar. 20, 2023

(87) PCT Pub. No.: WO2022/069498
PCT Pub. Date: Apr. 7, 2022

(65) Prior Publication Data
US 2023/0359155 A1 Nov. 9, 2023

(30) Foreign Application Priority Data

Sep. 30, 2020 (LU) .......................... 102103

(51) Int. Cl.
*G05B 13/02* (2006.01)
(52) U.S. Cl.
CPC .................. *G05B 13/027* (2013.01)

(58) Field of Classification Search
CPC ......... G05B 13/027; C21B 5/006; C21B 7/24; C21B 2300/04; F27B 1/26; F27D 21/00;
(Continued)

(56) References Cited

U.S. PATENT DOCUMENTS 9,791,852 B2 10/2017 Lou et al.
2019/0093186 A1* 3/2019 Lee ......................... C21B 5/006
(Continued)

OTHER PUBLICATIONS

Ling Jian, "Constructing Multiple Kernel Learning Framework for Blast Furnace Automation", Oct. 4, 2012, IEEE Transactions on Automation Science and Engineering, vol. 9, No. 4 (Year: 2012).*
(Continued)

*Primary Examiner* — Christopher W Carter
(74) *Attorney, Agent, or Firm* — CANTOR COLBURN LLP

(57) ABSTRACT

Computer system, computer-implemented method and computer program product are provided for training a reinforcement learning model to provide operating instructions for thermal control of a blast furnace, where a domain adaptation machine learning model generates a first domain invariant dataset from historical operating data obtained as multivariate time series and reflecting thermal states of respective blast furnaces of multiple domains, a transient model of a generic blast furnace process is used to generate artificial operating data as multivariate time series reflecting a thermal state of a generic blast furnace for a particular thermal control action, a generative deep learning network generates a second domain invariant dataset by transferring the features learned from the historical operating data 21 to the artificial operating data, where the reinforcement learning model determines a reward for the particular thermal control action in view of a given objective function by processing the combined first and second domain invariant datasets, and dependent on the reward, the second domain
(Continued)

invariant data set is regenerated based on modified parameters, and repeating the determining of the reward to learn optimized operating instructions for optimized thermal control actions to be applied for respective operating states of one or more blast furnaces.

15 Claims, 11 Drawing Sheets

(58) Field of Classification Search
CPC ........ F27D 19/00; G06N 3/006; G06N 3/044; G06N 3/045; G06N 3/086; G06N 3/092
See application file for complete search history.

(56) References Cited

U.S. PATENT DOCUMENTS

| | | | |
|---|---|---|---|
| 2019/0095812 A1* | 3/2019 | Lee | G06N 20/00 |
| 2020/0257933 A1 | 8/2020 | Steingrimsson | |
| 2021/0033341 A1* | 2/2021 | Fujishima | F23N 5/102 |
| 2021/0064983 A1* | 3/2021 | Mai | G06N 3/08 |

OTHER PUBLICATIONS

T.A. Barbasova, "Blast-Furnace Melting Blast Control", 2019, 2019 IEEE Russian Workshop on Power Engineering and Automation of Metallurgy Industry: Research & Practice (Year: 2019).*
Yanjiao Li, "A Soft Sensing Scheme of Gas Utilization Ratio Prediction for Blast Furnace via Improved Extreme Learning Machine", 2019, Neural Processing Letters 2019, Springer Science+Buisness Media, LLC, part of Springer Nature 2018 (Year: 2018).*
International Search Report for corresponding application PCT/EP2021/076710 filed Sep. 28, 2021; Mail date Jan. 5, 2022.
Written Opinion for corresponding application PCT/EP2021/076710 filed Sep. 28, 2021; Mail date Jan. 5, 2022.
D. C. Sau. A reduced order mathematical model of the blast furnace raceway with and without pulverized coal Injection for real time plant application, International Journal of Modelling and Simulation, 2018.
Cedric Schockaert, "MTS-CycleGAN: An Adversarial-based Deep Mapping Learning Network for Multivariate Time Series Domain Adaptation Applied to the Ironmaking Industry", 2020.
Horl J, "Blast Furnace Optimization—The Next Generation", Iron and Steel Technology, vol. 4, No. 3 Mar. 1, 2007, XP001556903.

* cited by examiner

COMPUTER SYSTEM AND METHOD PROVIDING OPERATING INSTRUCTIONS FOR THERMAL CONTROL OF A BLAST FURNACE

TECHNICAL FIELD

The present disclosure generally relates to systems for controlling blast furnaces, and more particularly, relates to methods, computer program products and systems for using machine learning methods to generate operating instructions for blast furnaces.

BACKGROUND

Blast furnaces are used to produce melted iron as raw material for steel. A blast furnace has very complicated processes to be modeled as they depend on multivariable process inputs and disturbances. It is an objective to reduce material and fuel consumption in order to optimize overall furnace efficiency and stability, melted iron quality, and also to improve the lifetime of the furnace. Therefore, it is desired to provide optimized operating instructions for complex production target definition.

SUMMARY

This technical problem is solved by the features of the independent claims by training a reinforcement learning (RL) model implemented by a recurrent neural network to provide operating instructions for thermal control of a blast furnace. The operating instructions relate to corresponding thermal control actions. A thermal control action, as used herein, refers to any action which affects an actuator for the purpose of exercising thermal control on the blast furnace process. Dependent on the level of control automation, the operating instructions may target human operators to provide guidance for correct control of the blast furnace, or they may directly instruct a thermal controller of the blast furnace, which can execute such instructions without human interaction.

Thereby, real-world (measured) operating data from multiple blast furnaces are used together with a simulation model (transient model) of the blast furnace process to train the recurrent neural network model by reinforcement learning. This can be understood as an offline RL model training at data level and simulation model level. From historic recorded data, multiple additional features can be generated providing better insight for characterization of the blast furnace process. Those features are phenomena defined by rules implemented from recorded raw data, or forecast of process phenomena available in the form of a prediction provided by machine learning models.

When trained, the RL model is providing recommendations for operating instructions to the main actuators of the blast furnace, such as for example: Tuyere and blast set-points such as Pulverized Coal Injection (PCI) rate (kg/s), blast flow rate (Nm3/s), oxygen enrichment (%), etc., and/or burden composition and charging set-points such as coke rate (kg/charge), basicity, burden distribution, etc. The provided recommendation ensures that an objective function will be optimized when the process is in its thermal equilibrium following the implementation of the above-mentioned recommendations either by a virtual operator (level 5 of autonomy-maximum level of autonomy) or manually by a human operator. The objective is defined by a blast furnace expert and can be composed of multiple objectives such as, for example, (1) fuel consumption minimization, (2) blast furnace life time maximization, (3) $CO_2$ rejection minimization, (4) iron quality and amount stabilizing the furnace operation. Each objective is weighted (e.g., by the expert) to define a global objective employed for training the RL model. When the model is trained and deployed in production, it can continue to learn continuously (online RL model training) from the deviation between the global objective and the actual objective which was reached after a recommended operating instruction has been executed for thermal control of the respective blast furnace.

In one embodiment, a computer-implemented method is provided for training a reinforcement learning model to provide operating instructions for thermal control of a blast furnace. For example, the reinforcement learning model may be implemented by a recurrent neural network.

A domain adaptation machine learning model, which has been trained by transfer learning, processes historical operating data obtained as multivariate time series from a plurality of blast furnaces of multiple domains. The historical operating data reflect thermal states of respective blast furnaces of multiple domains. Typically, several thousands of sensors per blast furnace are measuring operating parameters such as, for example, temperature, pressure, chemical contents etc. Such measured parameters at a particular point in time define the respective thermal state of the blast furnace at that point in time. Due to multiple characteristics of each blast furnace (e.g., operating mode, size, input material (material composition), etc.), it is not possible to directly compare two blast furnaces (source and target blast furnaces) without applying a dedicated transformation of the multivariate time series data.

The domain adaptation machine learning model generates as output a first domain invariant dataset representative of the thermal state of any of the blast furnaces irrespective of the domain. The historical operating data typically were collected in the past from a plurality of different blast furnaces (e.g., of different sizes, operated under different conditions, etc.) in response to respective thermal control actions. Typically, each blast furnace corresponds to a particular domain, but a domain can also be a particular operation of a blast furnace. The domain adaptation machine learning model is trained to perform a kind of normalization operation of the data obtained from different domains so that, in the end, such data become comparable.

Different approaches to transfer learning can be used. For example, the domain adaptation machine learning model may be implemented by a deep learning neural network with convolutional and/or recurrent layers trained to extract domain invariant features from the historical operating data as the first domain invariant dataset. In this embodiment, the transfer learning is implemented to extract domain invariant features from the historical operating data. A feature in deep learning is an abstract representation of characteristics of a particular blast furnace extracted from multivariate time series data which were generated by the operation of this particular blast furnace. By applying transfer learning, it is possible to extract domain invariant features from multiple real-world blast furnaces that are independent of a specific furnace (i.e. independent of the various domains).

In an alternative approach, the domain adaptation machine learning model has been trained to learn a plurality of mappings of corresponding raw data from the plurality of blast furnaces into a reference blast furnace. The reference blast furnace can be a virtual blast furnace which represents a kind of average blast furnace, or an actual blast furnace. Each mapping is a representation of a transformation of a respective particular blast furnace into the reference blast furnace. In this approach, the plurality of mappings corresponds to the first domain invariant dataset. For example, such a domain adaptation machine learning model may be implemented by a generative deep learning architecture based on the CycleGAN architecture, popular for fake image generation. The CycleGAN is an extension of the GAN architecture that involves the simultaneous training of two generator models and two discriminator models. One generator takes data from the first domain as input and outputs data for the second domain, and the other generator takes data from the second domain as input and generates data for the first domain. Discriminator models are then used to determine how plausible the generated data are and update the generator models accordingly. The CycleGAN uses an additional extension to the architecture called cycle consistency. The idea behind is that data output by the first generator could be used as input to the second generator and the output of the second generator should match the original data. The reverse is also true: that an output from the second generator can be fed as input to the first generator and the result should match the input to the second generator.

Cycle consistency is a concept from machine translation where a phrase translated from English to French should translate from French back to English and be identical to the original phrase. The reverse process should also be true. CycleGAN encourages cycle consistency by adding an additional loss to measure the difference between the generated output of the second generator and the original image, and the reverse. This acts as a regularization of the generator models, guiding the image generation process in the new domain toward image translation. To adapt the original CycleGAN architecture from image processing to the processing of multivariate time series data for obtaining the first domain invariant dataset the following modifications can be implemented by using recurrent layers (LSTM as an example) combined with Convolutional layers to learn the time dependency of the multivariate time series data as described in detail in C. Schockaert, H. Hoyez, (2020) "MTS-CycleGAN: An Adversarial-based Deep Mapping Learning Network for Multivariate Time Series Domain Adaptation Applied to the Ironmaking Industry", In arXiv: 2007.07518.

The obtained first domain invariant data set represents thermal states of the blast furnaces which were present after respective thermal control actions were applied to the respective furnaces. After the domain adaptation, this representation is not tied to a particular blast furnace anymore (either in the form of a learned mapping to the reference blast furnace, or in the form of the extracted common features).

In parallel, a transient model of a generic blast furnace process is used to generate artificial operating data as multivariate time series for a particular thermal control action reflecting a thermal state to which a generic blast furnace transitions after the application of the particular control action. The generic blast furnace is a virtual device (similar as the reference blast furnace). The transient model is a transient based numerical model with appropriate physical, chemical, thermal, and flow conditions for generating reasonable artificial data representing the thermal states of the generic blast furnace. The transient model reflects respective physical, chemical, thermal, and flow conditions of the generic blast furnace, and provides solutions for upward gas flow and downward moving of solid layers as structured in the generic blast furnace while exchanging heat, mass, and momentum transfer.

The model receives, as input parameters, the burden materials amount and chemical analysis along with the hot blast conditions such as temperature, pressure, PCI rate, and oxygen enrichment. The transient model has: an energy equation to predict hot metal temperature, species equations to calculate hot metal chemical compositions, and gas phase equations to predict top gas temperature, efficiency (Eta CO), and pressure. Due to the transient nature of the model, artificial dynamic time-series data can be generated by changing input parameters over time, resembling the operation of real-world blast furnaces. It is advantageous that the transient model can use a data range for the input parameters which exceeds the data range that is covered by the historic operating data of the real-world blast furnaces. In other words, the parameter range for the generic blast furnace can be expanded to an operating parameter space that cannot be covered by real-world blast furnace operating data.

The generic blast furnace is divided into a finite number of layers over the height of the furnace. Each layer is composed of one charge of raw materials (e.g., iron ores and coke). These layers represent the computational cells, over which the equations are being numerically solved. The boundary condition for the gas phase properties such as composition, velocity, and temperature are defined using a raceway sub-model whereas the boundary condition for the solid phase is defined as the charging material compositions in the room temperature. Such a raceway model is described for example in "Deepak Sau et. Al. A reduced order mathematical model of the blast furnace raceway with and without pulverized coal injection for real time plant application. International Journal of Modelling and Simulation, DOI: 10.1080/02286203.2018.1435759. February 2018". Pulverized coal is injected into blast furnace tuyeres to reduce coke consumption as well as to reduce hot metal production cost. Knowledge of the combustion behavior of pulverized coal in the blast furnace raceway zone and accumulation of unburnt char are important. This paper describes a reduced order raceway model of the blast furnace for real time plant application. The model is capable of predicting radial temperature and gas composition profiles in the raceway zone with and without pulverized coal injection (PCI). Influence of all the key operating process parameters such as PCI rate, blast temperature, blast volume, oxygen enrichment and steam addition on the raceway combustion behavior, temperature and gas composition profiles as well as raceway depth have been investigated and validated with literature and plant database, wherever possible.

Fully resolving the gas and solid phase is computationally very expensive. Therefore, according to an embodiment, to save computing resources (and thereby energy), the gas phase can be regarded as a steady state because the resistance time of gas (about 3 s) is much less than the time step (about 2 min). However, the solid phase is regarded as a transient phase. The solution algorithm firstly solves the gas phase equations in an iterative sequential way to satisfy the relative tolerance of the parameters in each time step. When the gas phase parameters converge to a defined tolerance, then the solid phase equations are solved sequentially in the same time step. The time loop continues until the end of the simulation. The gas and solid parameters as well as the transfer parameters such as heat and mass transfers are updated in the beginning of each time step. In the sequential fashion, once solving for one parameter, the other parameters are considered to be known meaning that the old values are used. In this way, the non-linear terms and coupled parameters can be solved avoiding complex and expensive block solvers.

In one implementation, the transient model has a plurality of computational cells with each cell representing a respective layer of the generic blast furnace composed of one charge of raw materials. Each computational cell solves gas phase equations in an iterative sequential way to satisfy relative gas phase parameter tolerances in each time step. When the gas phase parameters converge to a predefined tolerance value, solid phase equations are sequentially solved in the same time step.

The iterative solving of the gas phase equations includes for each iteration of a pressure-velocity correction loop: calculating gas, solid and liquid properties; calculating reaction rates and heat transfer coefficients; and calculating gas temperature, species, velocity, and pressure drop.

Once the gas phase parameters have converged to said predefined tolerance value, the computation continues with the sequential solving of solid phase equations in the same time step includes: calculating solid temperature and species; calculating liquid temperature and species; and calculating solid velocity.

The artificial operating data obtained from the transient model are then processed by a generative deep learning network trained on multivariate time series of the historical operating data. This allows augmenting the artificial operating data with features of the real-world operating data to make them more realistic. An appropriately trained generative deep learning network can augment the artificial data in a manner that the augmented synthetic operating data become indistinguishable from real-world operating data for an expert. It is advantageous for training a reinforcement learning model with data which have similar characteristics as the real-world test inputs which are expected when operating the reinforcement learning model in the prediction phase. That is, the processing of the artificial operating data generates a second domain invariant dataset which is augmented with features learned from the historical operating data. Although the second domain invariant dataset is a mere synthetic dataset based on the computations of the transient model, it nevertheless is a domain invariant dataset which shows characteristic features which are present in the real-world historical operating data time series.

The reinforcement learning model is now trained with the combined first and second domain invariant datasets. If training would only rely on the first dataset, the reinforcement learning model could not learn optimized control instructions which had not been applied to the plurality of blast furnaces. By combining such real-world training datasets with the artificially generated datasets, the transient model can be used for simulating the reaction of the generic blast furnace to alternative control actions applied to a given thermal state of the generic blast furnace under varying optimization objectives. When processing the combined first and second domain invariant datasets, the reinforcement learning model determines a reward for the particular thermal control action which was used by the transient model for computing the second invariant dataset in view of a given objective function and the current state of the blast furnace. Reward functions describe how the reinforcement leaning model (i.e. the agent) ought to behave. In other words, they have normative content, stipulating what the agent is supposed to accomplish. There are no absolute restrictions, but if a reward function is "better behaved", then the agent learns better. Practically, this means speed of convergence is increased and the agent does not get stuck in local minima. As an example, a reward function can measure "how far" from the Pareto front of the multi-objective function, the particular thermal control action is leading the process. By definition, a Pareto front is a set of nondominated solutions, being chosen as optimal, if no objective can be improved without sacrificing at least one other objective. For a given objective, the measurement of the improvement delta of another objective can, for example, be measured by means of gradient analysis. A reward function can be a function of those measurements characterizing the properties of the Pareto front. A person skilled in the art may use other appropriate reward functions If the determined reward is below a predefined minimum reward then the recommended thermal control action (control instruction) was not optimal with regard to the intended impact on the thermal state of the blast furnace. In such cases, alternative control actions can be simulated by the transient model. For this purpose, a genetic search and/or a Bayesian optimization algorithm is guiding the search for modified parameters (i.e., input parameters for the transient model) for a further (alternative) thermal control action based on the current environment of the reinforcement learning model and the thermal control action output of the current learning step (i.e. the control action which was leading to a too low reward). The transient model now re-generating the second domain invariant data set (updated second dataset) based on the modified parameters. The updated second dataset is then fed into the input layer of the reinforcement learning model and a new reward is determined for the updated second dataset. This process is performed iteratively until the reinforcement learning model has learned to output optimized operating instructions for optimized thermal control actions for any foreseeable situation.

Once the reinforcement learning model has been trained as described, it can be operated for predicting an optimized operating instruction for at least one actuator of a particular blast furnace in production based on a current operating state data of that particular blast furnace. In other words, the trained reinforcement learning model receives test input data which include operating data matching the input layer of the reinforcement learning model, and which specify the current (thermal) state of the blast furnace. The model processes the test input data and provides as output a prediction for an optimized operating instruction corresponding to a thermal control action to be applied to the blast furnace to achieve an optimized result in view of the given objective function.

Advantageously, each prediction data set can be used to further improve the training of the reinforcement learning model. For this purpose, the model determines the reward after applying the thermal control action in accordance with the optimized operating instruction (predicted output) to the at least one actuator based on the new state of the particular blast furnace after execution of the thermal control action. If the reward is below a predefined threshold, the transient model regenerates the second domain invariant data for one or more alternative operating instructions for re-training the reinforcement learning model. This re-training can be applied after the application of any thermal control action in accordance with the respective predicted optimized operating instruction.

Advantageously, the reinforcement learning model is trained to learn the optimized operating instructions so that an associated objective measurement lies within a predefined range from the Pareto front for a corresponding multi-dimensional objective function.

In one embodiment, the transient model has a plurality of computational cells with each cell representing a respective layer of the generic blast furnace composed of one charge of raw materials. Each computational cell solves gas phase equations in an iterative sequential way to satisfy relative gas phase parameter tolerances in each time step. When the gas phase parameters converge to a predefined tolerance value, the computational cell sequentially solves solid phase equations in the same time step.

TABLE 1

Levels of thermal control automation for blast furnace control

| Level 1: Blast Furnace operator only | Level 2: Operator assisted | Level 3: Partial automation | Level 4: High automation | Level 5: Full automation |
|---|---|---|---|---|
| Only raw data visualization on a screen. | White box data driven models such as rules are providing to the operator significant information for controlling the blast furnace. Ex: detection of process phenomena defined by a process engineer machine learning model forecasting hot metal silicon content or temperature tendency | The operator does not need to monitor all measurements/ phenomena to control the furnace. Part of the actuators are autonomous. Ex: machine learning models recommending the charging matrix recommendation of coke charging or coal injection based on prediction of hot metal Si content (basic production target definition) | Operator not required for specific defined operations of the furnace, but still required for operations not covered by the automation system. Ex: recommendation model for optimal thermal regulation in usual operation taking into account complex production target (minimizing fuel, increase life time of the furnace, minimize $CO_2$ emission, etc) | Operator not required, no manual operation. All operations are learned by a machine learning method in all known environment. Ex: recommendation model for optimal thermal regulation in all operations taking into account complex production target definition. |

Table 1 describes five automation levels for blast furnace control. A combination of the recommendation reinforcement learning model and further associated machine learning models (example: process phenomena forecasting, hot metal temperature forecasting, etc.) generating advanced contextual information for process characterization can be used to achieve level 4 or 5 automation, while the associated machine learning models alone only can contribute to level 2 or 3 of automation. Training a recommendation model without the associated machine learning models may lead to level 3 automation. The herein disclosed approach for training a reinforcement learning model for recommending (predicting) optimal thermal control actions can be used to achieve a level 4 or 5 automation given that the process is precisely represented by advanced contextual data generated by machine learning models and additional sensors for process characterization as described in more detail in the detailed description. Such associated machine learning models can be used to add further data augmentation capabilities to improve the training data set for the reinforcement learning in that they provide predictions based on the received operating data (raw sensor data) serving as further inputs to train the reinforcement learning model going beyond the domain invariant process data. With such additional "contextual" information, the reinforcement learning model acquires knowledge about new dimensions which can be used to learn, more precisely, the best actions for thermal control.

When using such associated machine learning models for predicting information about the future thermal evolution of a particular blast furnace state based on the historical operating data and/or further measured environmental data related to the environment of the blast furnace, the associated machine learning models need to be trained accordingly to complement the historical operating data (obtained from sensors) with future multivariate time series data which relate to future time points. The generated future multivariate time series can then be processed by the domain adaptation machine learning model in the same manner as the historical operating data to augment the first domain invariant dataset with data that relates to future time points.

An associated machine learning model can be trained in the following way. In a first training step, a plurality of base models is trained with different selections of operating data and/or environmental data using one or more machine learning algorithms to provide base model specific future multivariate time series data as training input to the particular one of the machine learning models. Thereby, each base model focuses on a single particular aspect of the blast furnace process (e.g., the prediction of hot metal temperature tendency during a given future time interval). In a second training step, the associated machine learning model is trained with said base model specific future multivariate time series data to learn which combination of base models is most appropriate for which state of the blast furnace.

Further aspects of the disclosure will be realized and attained by means of the elements and combinations particularly depicted in the appended claims. It is to be understood that both, the foregoing general description and the following detailed description are exemplary and explanatory only and are not restrictive of the disclosure as described.

DETAILED DESCRIPTION

Figure 1:
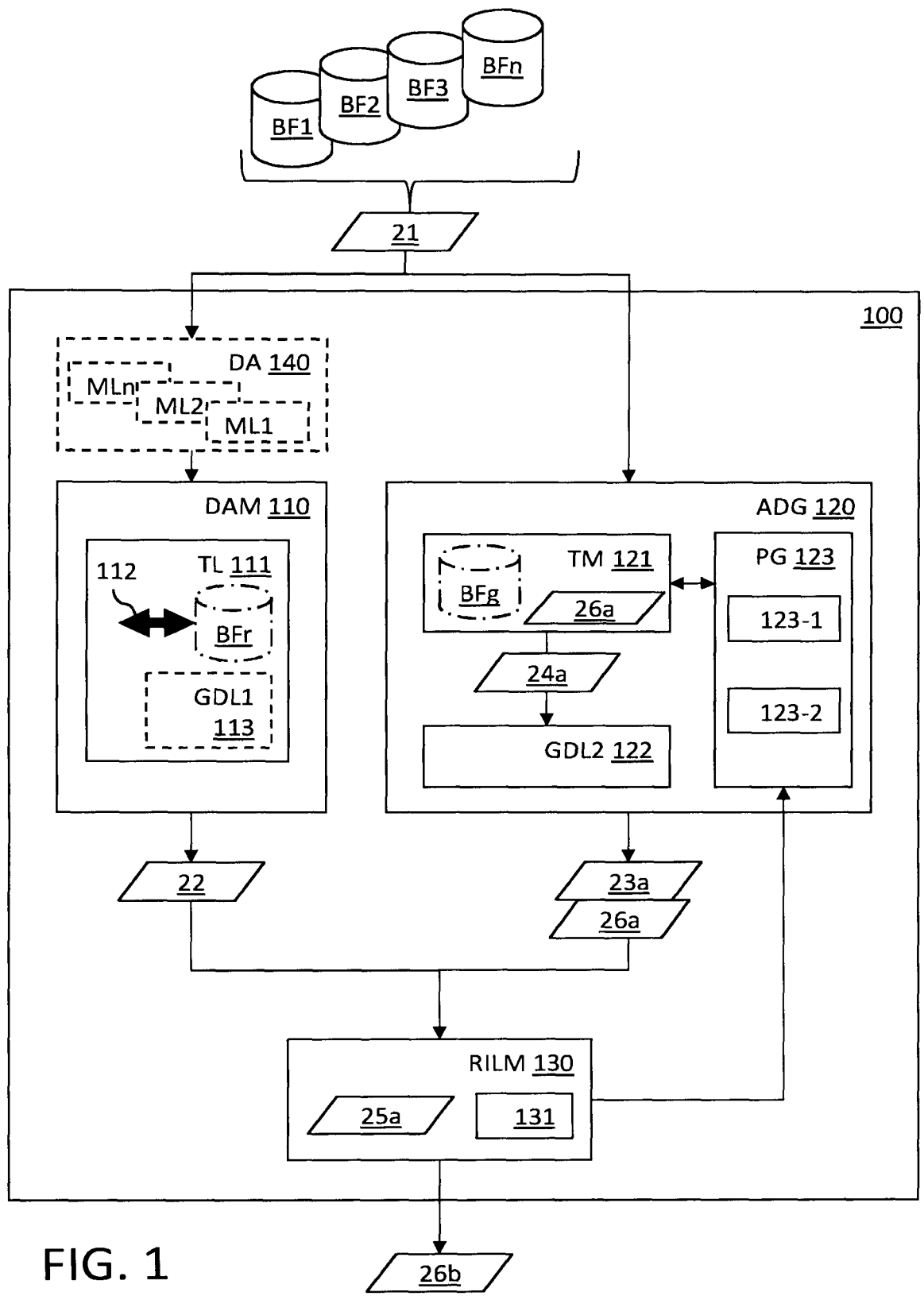
FIG. 1 shows a simplified diagram of an embodiment of a computer system for training a reinforcement learning model to provide operating instructions for thermal control of a blast furnace.

FIG. 1 shows a simplified diagram of a basic embodiment of a computer system 100 for training a reinforcement learning model 130 to provide operating instructions for thermal control of a blast furnace. FIG. 1 is described in the context of FIG. 2 which is a simplified flowchart of a computer-implemented method 1000, which can be performed by embodiments of the computer system 100. Therefore, the following description of FIG. 1 in the context of FIG. 2 refers to reference numbers of both figures.

In one embodiment, the computer system 100 is communicatively coupled with a plurality of blast furnaces BF1 to BFn. The blast furnaces BF1 to BFn may belong to different domains and provide historical operating data 21 obtained as multivariate time series and reflecting thermal states of the respective blast furnaces. Example of such historical operating data include, but are not limited to, burden materials amount and chemical analysis, temperature, pressure, PCI rate, and oxygen enrichment, with an energy equation to predict hot metal temperature, one or more species equations to calculate the hot metal chemical compositions, and one or more gas phase equations to predict top gas temperature, efficiency (Eta CO), and pressure.

In real world-blast furnaces, different domains may be associated with different combinations of parameter values in the historical operating data 21 describing the thermal states of blast furnaces in the different domains although there exist similarities between such thermal states. Therefore, system 100 has a domain adaptation machine learning model DAM 110 to generate 1100 a first domain invariant dataset 22 representative of the thermal state of any of the blast furnaces BF1 to BFn irrespective of the domain. DAM 110 has been trained by using a transfer learning method TL 111. In one implementation, DAM 110 may be implemented by a generative deep learning neural network GDL1 113 with convolutional and/or recurrent layers trained to extract domain invariant features from the historical operating data 21 as the first domain invariant dataset 22.

In an alternative implementation, DAM 110 may be implemented by a generative deep learning architecture (e.g., based on the earlier described CycleGAN architecture) that has been trained to learn a plurality of mappings 112 of corresponding raw data from the plurality of blast furnaces BF1 to BFn into a reference blast furnace BFr. Thereby, each mapping is a representation of a transformation of the respective blast furnace (e.g., BF1) into the reference blast furnace BFr. In this implementation, the plurality of mappings corresponds to the first domain invariant dataset 22.

System 100 further has an artificial data generator module ADG 120 configured to generate 1200 artificial operating data 24a as multivariate time series reflecting a thermal state of a generic blast furnace BFg for a particular thermal control action 26a. For this purpose, ADG 120 uses a transient model 121 of the generic blast furnace process. The transient model 121 is a simulation model which reflects respective physical, chemical, thermal, and flow conditions of the generic blast furnace, and provides solutions for upward gas flow and downward moving of solid layers as structured in the generic blast furnace while exchanging heat, mass, and momentum transfer. In general, the simulation model is based on simulation parameters which correspond to such real-world state parameters monitored in the historical operating data.

Figure 3A:
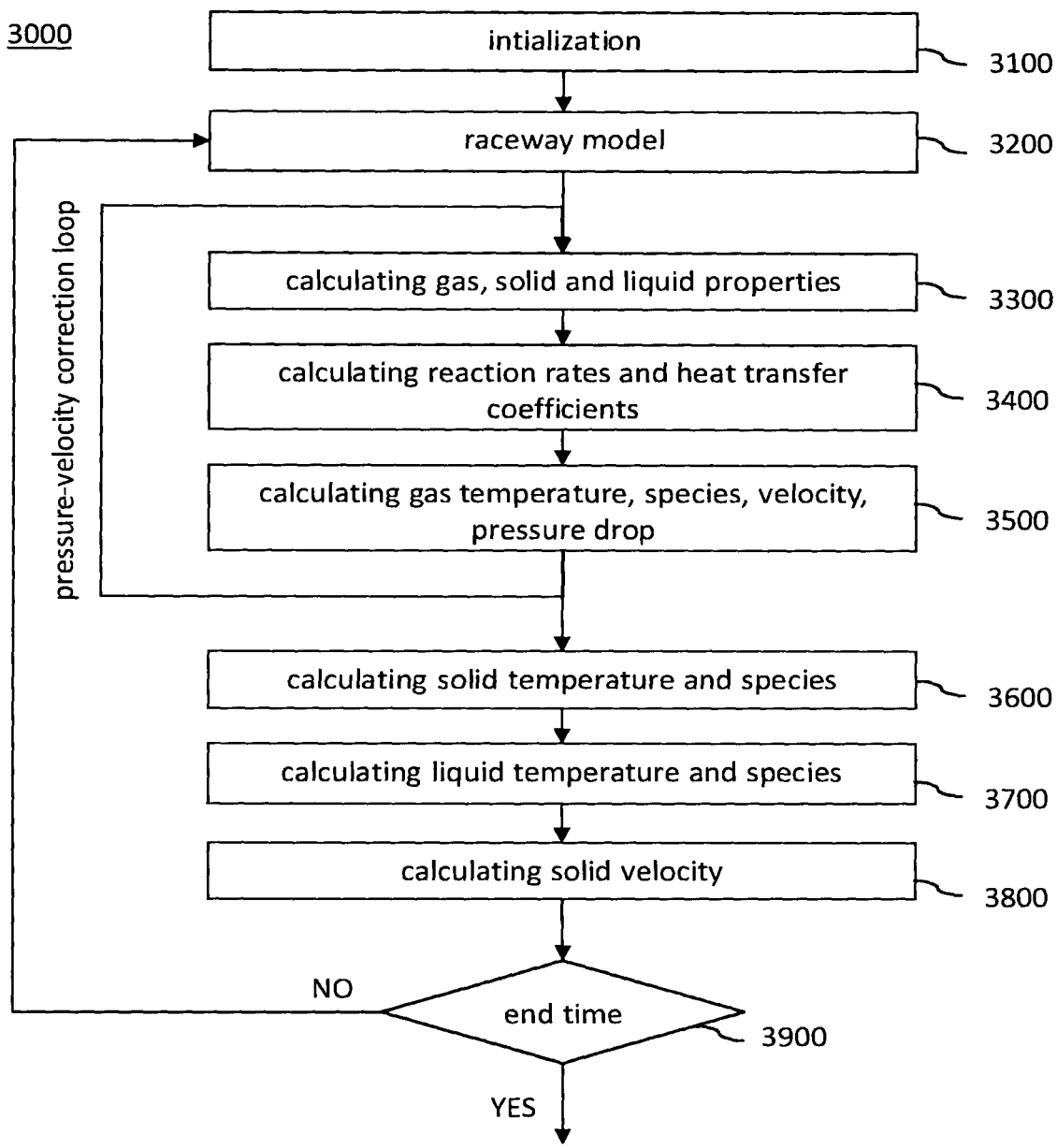
FIG. 3A illustrates a simplified flowchart reflecting the processing of a transient model according to an embodiment with a plurality of computational cells with each cell representing a respective layer of a generic blast furnace.

Turning briefly to FIG. 3A, the transient model 121 comprises a plurality of computational cells with each cell representing a respective layer of the generic blast furnace BFg composed of one charge of raw materials. Each computational cell is solving gas phase equations in an iterative sequential way to satisfy relative gas phase parameter tolerances in each time step (iteration time interval). Once the gas phase parameters converge to a predefined tolerance value, solid phase equations are sequentially solved in the same time step. The step of iteratively solving gas phase equations may include for each iteration of a pressure-velocity correction loop:
  calculating 3300 gas, solid and liquid properties;
  calculating 3400 reaction rates and heat transfer coefficients; and
  calculating 3500 gas temperature, species, velocity, and pressure drop.
Sequentially solving solid phase equations may include:
  calculating 3600 solid temperature and species;
  calculating 3700 liquid temperature and species; and
  calculating 3800 solid velocity.

Figure 3B:
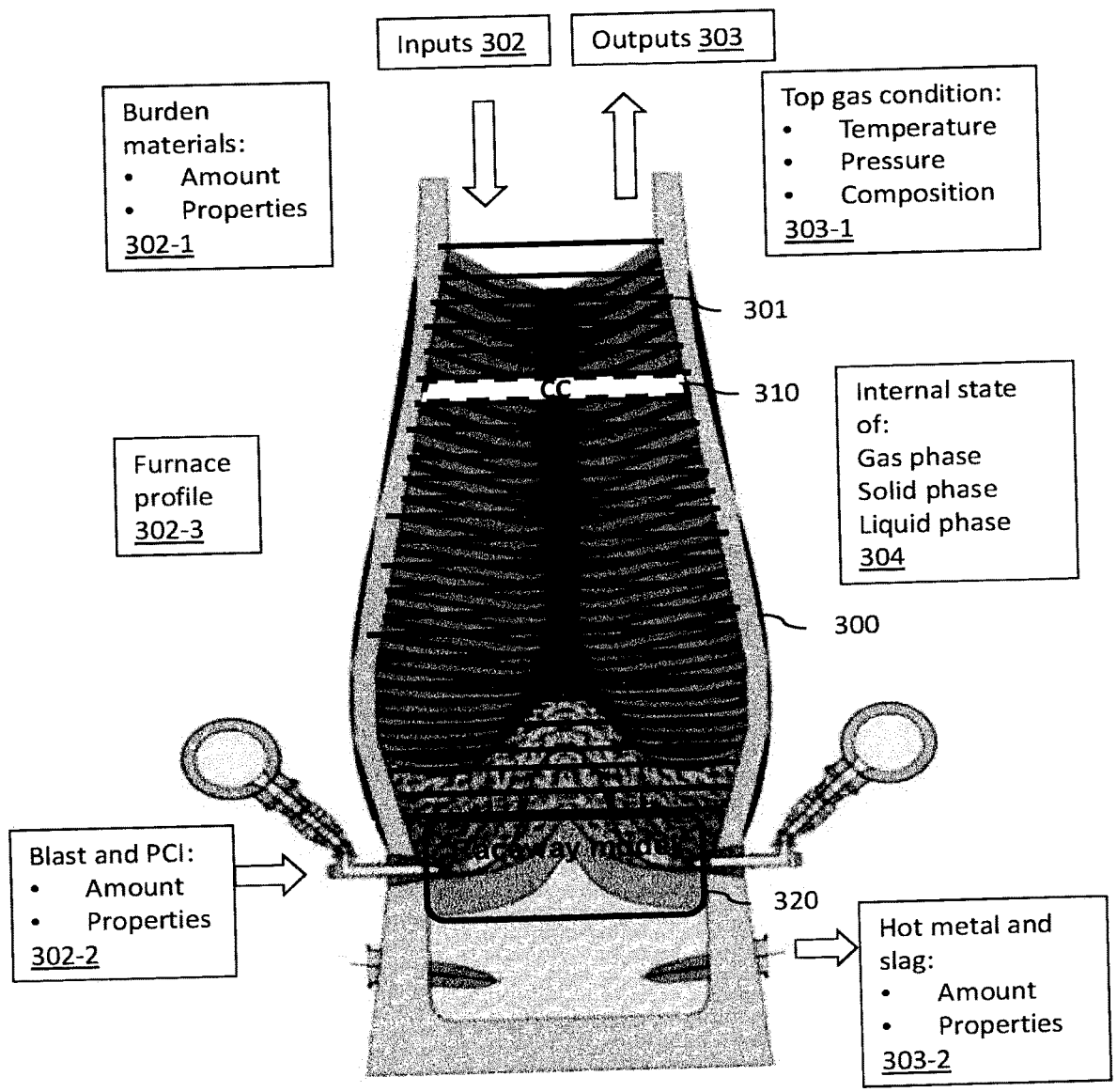
FIG. 3B illustrates computational cells in a visual representation of a blast furnace.

Turning now to FIG. 3B which illustrates computational cells CC in a visual representation 300 of a blast furnace, the transient model 121 may receive one or more of the following input parameters 302: burden materials 302-1 amount and chemical analysis, temperature, pressure, PCI rate 302-2, and oxygen enrichment. Further, the furnace profile 302-3 describes the geometry of the blast furnace, and therefore has an impact on the transfer time of charged material (e.g., a high blast furnace may have a transfer time of 8 h, whereas for a short one it may only be 6 h). The furnace profile 302-3 is a fixed parameter per blast furnace which is used for artificial data generation. It is clear for a person skilled in the art that the transient model takes into account the geometry of the blast furnace. The transient model generates outputs 303, for example, with an energy equation to predict hot metal temperature, one or more species equations to calculate the hot metal chemical compositions 303-2, and one or more gas phase equations to predict top gas temperature, efficiency (Eta CO), and pressure (cf. Top gas conditions 303-1).

In other words, the transient (simulation) model is a numerical model with appropriate physical, chemical, thermal, and flow conditions used to generate reasonable artificial data. Due to the transient nature of the model, artificial dynamic time-series data can be generated by changing input parameters over time, resembling real-world furnace operation. As a consequence, the (parameter) data range can be expanded to a widened operational space that cannot be covered by actual blast furnace data obtained from real-world blast furnaces.

In the transient model, the furnace is divided into a finite number of layers over the height of the furnace. In FIG. 3B, the various layers are separated by solid horizontal lines 301. Each layer is composed of one charge of raw materials, in this case, iron ores and coke. These layers represent the computational cells CC 310 as described earlier, over which the equations are being numerically solved. In one embodiment, the boundary condition for the gas phase properties such as composition, velocity, and temperature are defined using a raceway sub-model 320 whereas the boundary condition for the solid phase is defined as the charging material compositions in the room temperature. The internal state 304 of blast furnace 300 comprises sub-states for the gas, solid and liquid phases. The sub-state for the gas phase can be characterized by: Temperature (Tg, K), Pressure (p, Pa), Velocity (Vg, m/s), Species (CO, CO2, H2, H2O, N2). The sub-state for the solid phase can be characterized by: Temperature (Ts, K), Velocity (Vs, m/s), Species (Fe2O3, Fe3O4, FeO, Fe, Slag, CokeC, Cokeash). And the sub-state for the liquid phase can be characterized by: Temperature (Tl, K) and Species (Fe, slag, FeO).

Fully resolving of gas and solid phase is computationally very expensive (and time-consuming). Therefore, to save time and energy, the gas phase may be regarded as a steady state because the resistance time of the gas (about 3 s) is much less than the time step (about 2 min) defined as the iteration interval. However, the solid phase is regarded as a transient phase. The solution algorithm (cf. FIG. 3A) firstly solves the gas phase equations in an iterative sequential fashion to satisfy the relative tolerance of the parameters in each time step. When the gas phase parameters converge to a predefined tolerance value, then the solid phase equations are solved sequentially in the same time step. The time loop continues until the end of the simulation. The gas and solid parameters as well as the transfer parameters such as heat and mass transfers are updated in the beginning of each time step. In the sequential fashion, once solving for one parameter, the other parameters are considered to be known, meaning that the old values are used. In this way, the non-linear terms and coupled parameters can be solved avoiding complex and expensive block solvers.

As described above, the artificial operating data 24*a* generated by the transient model 121 are generated according to mathematical equations which result in clean data in that the artificial operating data 24*a* do not show any real-world characteristics, such as for example noise or shifts caused by respective measuring/sensor devices. To train a reinforcement learning model RILM 130 for making highly accurate predictions, it is desirable to provide training data to the model 130 which reflect the characteristics of the real-world operating data being used as test inputs for RILM 130. Therefore, ADG 120 uses a generative deep learning network GDL2 122 with recurrent layers to generate 1300 a second domain invariant dataset 23*a* by transferring the features learned from the historical operating data 21 to the artificial operating data 24*a*. GDL2 122 has been trained on multivariate time series of the historical operating data 21 to learn said real-world characteristics from the historic operating data and to apply the learned patterns to the simulated artificial operating data 24*a*. This results in a purely synthetic dataset 23*a* reflecting the thermal state of the generic blast furnace BFg in response to the thermal control action 26*a*. It is to be noted that the learning of natural characteristics of each signal in the context given by other signals by using a generative deep learning network using recurrent layers is similar to well-known techniques applied to images for learning the style of a specific set of drawings and apply that style on any other image. Similar techniques can be applied on multivariate time series and are approaches that can be resolved, for example, by the CycleGAN-based algorithm mentioned earlier, when adapted to multivariate time series data.

Both data sets, the first domain invariant dataset 22 and the synthetic second invariant data set 23, are provided as training data to RILM 130. RILM 130 determines 1400 a reward 131 for the particular thermal control action 26*a* in view of a given objective function by processing the combined first and second domain invariant datasets 22, 23*a*. Based on such training data, RILM 130 learns thermal control actions that are depending on the state of the (generic) blast furnace (the environment). For example, this environment may be defined by, as an illustration, the operation of the blast furnace, the material composition, etc.

Dependent on the reward 131, ADG 120 re-generates 1300 the second domain invariant data set based on modified parameters 123-2. A parameter generator PG 123 uses a genetic search and/or a Bayesian optimization algorithm 123-1 to guide the search for the modified parameters for a further thermal control action based on the current environment 25*a* of RILM 130 and the thermal control action 26*a* output of the current learning step. With the modified parameters, the transient model simulates the thermal state for the further control action. The re-generated second domain invariant data set is then provided to RILM 130 as a new training input and the reward is determined again for the new training input. This process is repeated until the current reward exceeds 1500 a predefined reward threshold value to learn optimized operating instructions for optimized thermal control actions.

Figure 4:
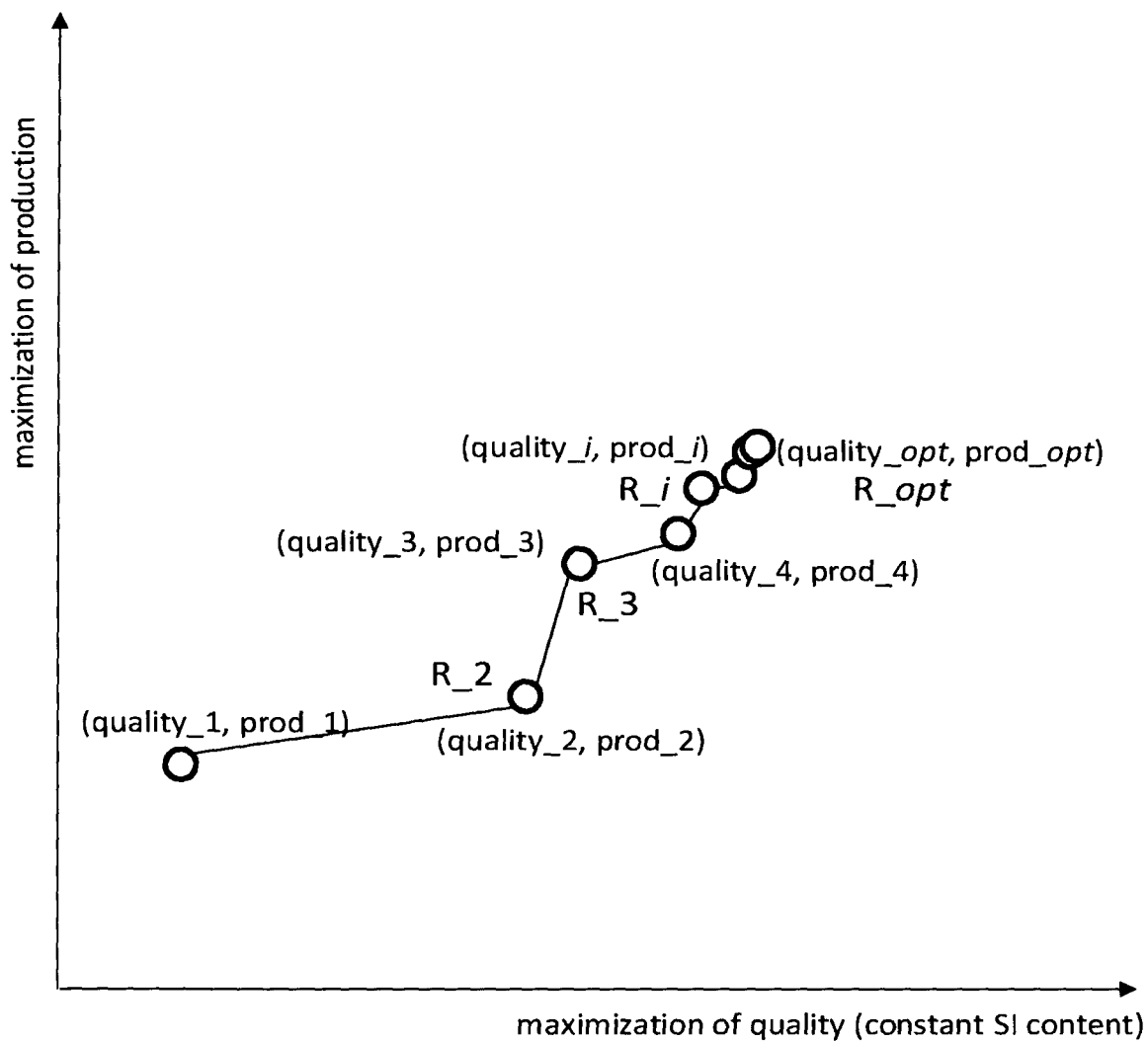
FIG. 4 illustrates an example embodiment of a reward calculation for the reinforcement learning model.

In the following, a real-world scenario example for reward calculation is described as illustrated in FIG. 4. It is to be noted that a person skilled in the art may use other appropriate reward functions for implementing reinforcement learning model. The following example scenario describes an optimization to identify the optimal actuators value for a simple bi-objective function to maximize, by using a genetic search algorithm.

Objective: maximization of quality (constant Si content), and maximization of production Actuators: PCI rate (kg/s), blast flow rate (Nm3/s), coke rate (kg/charge)

Reward:
=1/(Euclidian_dist_to_pareto_front)
Approximated, as an example, by improvement delta analysis of each objective:
1/eucl_dist ((quality_prev, prod_prev), (quality_new, prod_new))

In this example, the definition of reward is only valid with a genetic search algorithm ensuring that there is a convergence towards the Pareto front. That is, in this example of a bi-objective function to maximize, the improvement of quality and of production are both positive between two consecutive iterations.

Initial blast furnace thermal state (the current environment): S_init
Iteration 1:
Actuators value=[PCI_1, blast_flow_rate_1, coke_rate_1]
Objective measurement=quality_1; prod_1
Iteration 2:
Actuators value=[PCI_2, blast_flow_rate_2, coke_rate_2]
Objective measurement=quality_2; prod_2
Reward=R_2=1/eucl_dist ((quality_1, prod_1), (quality_2,prod_2))
Iteration 3:
Actuators value=[PCI_3, blast_flow_rate_3, coke_rate_3]
Objective measurement=quality_3; prod_3
Reward=R_3=1/eucl_dist ((quality_2, prod_2), (quality_3,prod_3))
Iteration i:
Actuators value=[PCI_i, blast_flow_rate_i, coke_rate_i]
Objective measurement=quality_i; prod_i
Reward=R_i=1/eucl_dist ((quality_i−1, prod_i−1), (quality_i,prod_i))

Iteration opt: (pareto front reached)
    Actuators value=[PCI_opt, blast_flow_rate_opt, coke_rate_opt]
    Objective measurement=quality_opt; prod_opt
    Reward=R_opt=1/eucl_dist ((quality_opt−1, prod_opt−1), (quality_opt,prod_opt))

Figure 5:
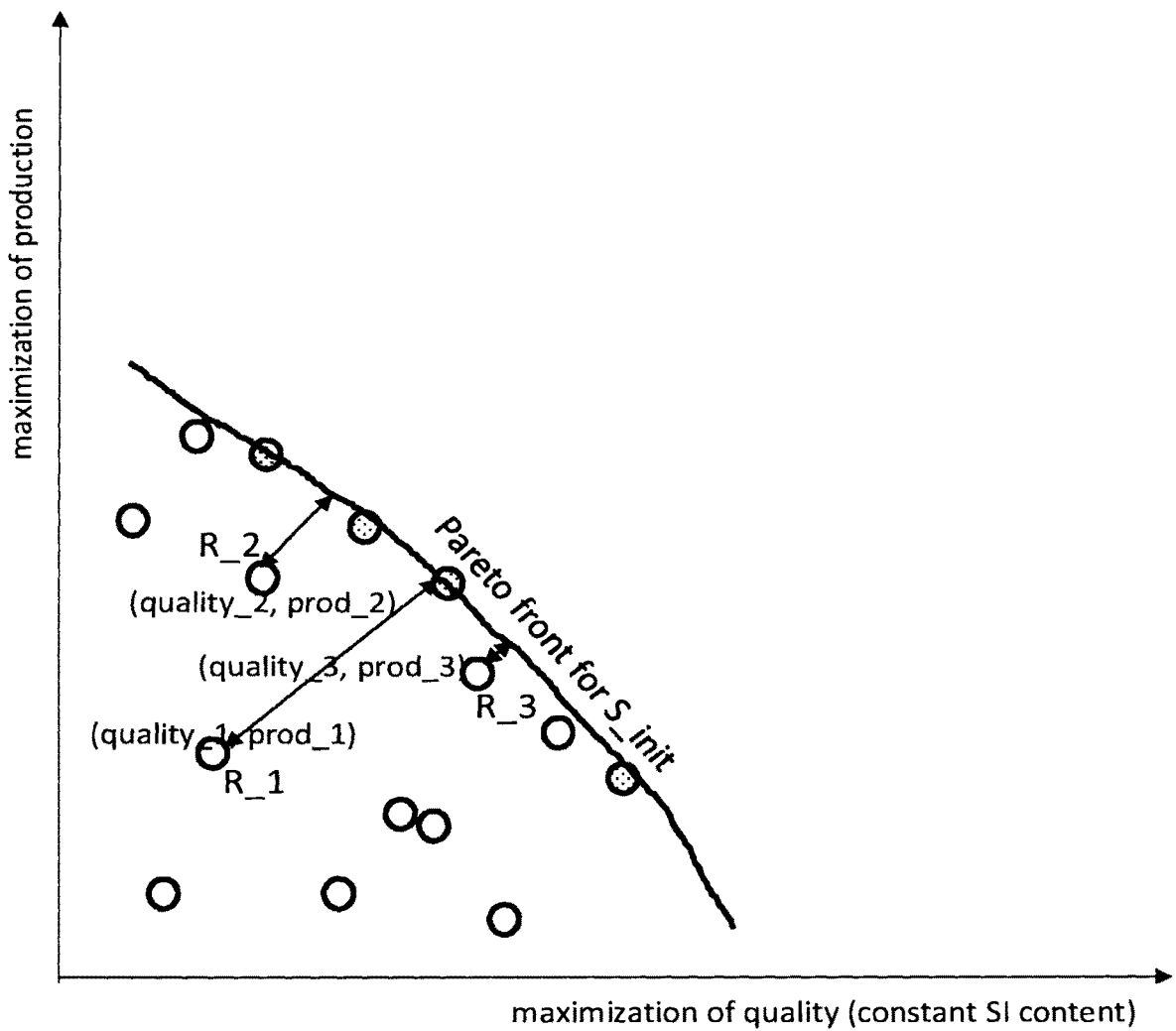
FIG. 5 illustrates a Pareto front as the border of a point cloud in the objective space for the reward function.

Without using a genetic search algorithm, a time-consuming random search may be performed. In FIG. 5, the Pareto front for such case is characterized by the points (quality_i, prod_i) with a dotted fill-pattern (at the border of the point cloud in the objective space). In that case, the reward for each point (quality_i, prod_i) can be computed as the inverse of the Euclidian distance and is calculated after the Pareto front has been identified (not during the random search process).

In summary, the reinforcement learning model 130 is trained to learn the optimized operating instructions so that an associated objective measurement lies within a predefined range from the Pareto front for a corresponding multi-dimensional objective function.

Figure 2:
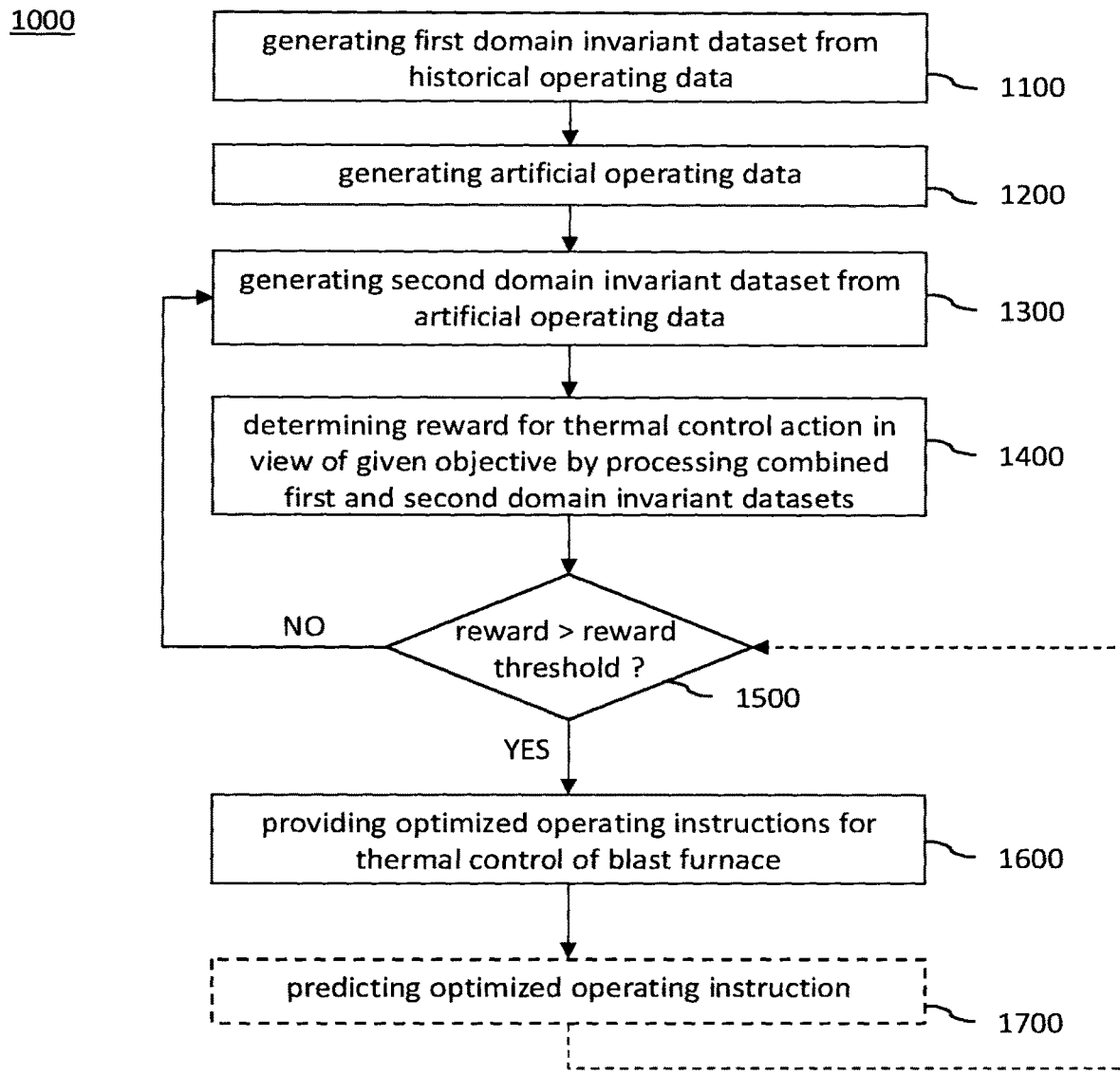
FIG. 2 is a simplified flowchart of a computer-implemented method which can be performed by embodiments of the computer system.

Once the learning is completed, RILM 130 has been trained to provide 1600 optimized operating instructions for thermal control of a real-world blast furnace in response to a test input with the current operating data describing the current state of said blast furnace (cf. FIG. 2). Optionally, the training of RILM 130 can continue in an online mode while the blast furnace is operating.

In the online mode, the reinforcement learning model 130 predicts 1700 (cf. FIG. 2) an optimized operating instruction for at least one actuator of a particular blast furnace in production based on the current operating state data of said blast furnace. It is assumed that the thermal control action for the optimized operating instruction is applied to the blast furnace (either by an operator or automatically via a corresponding control system). After the thermal control action has been applied to the at least one actuator in accordance with the optimized operating instruction the reward is now determined based on the new state of said blast furnace which is reached after execution of the thermal control action. Again, the determined reward is compared 1500 to the predefined reward threshold. If the reward is below this threshold, ADG 120 regenerates (using the transient model 121) the second domain invariant data for one or more alternative operating instructions for re-training the reinforcement learning model 130.

Figure 6A:
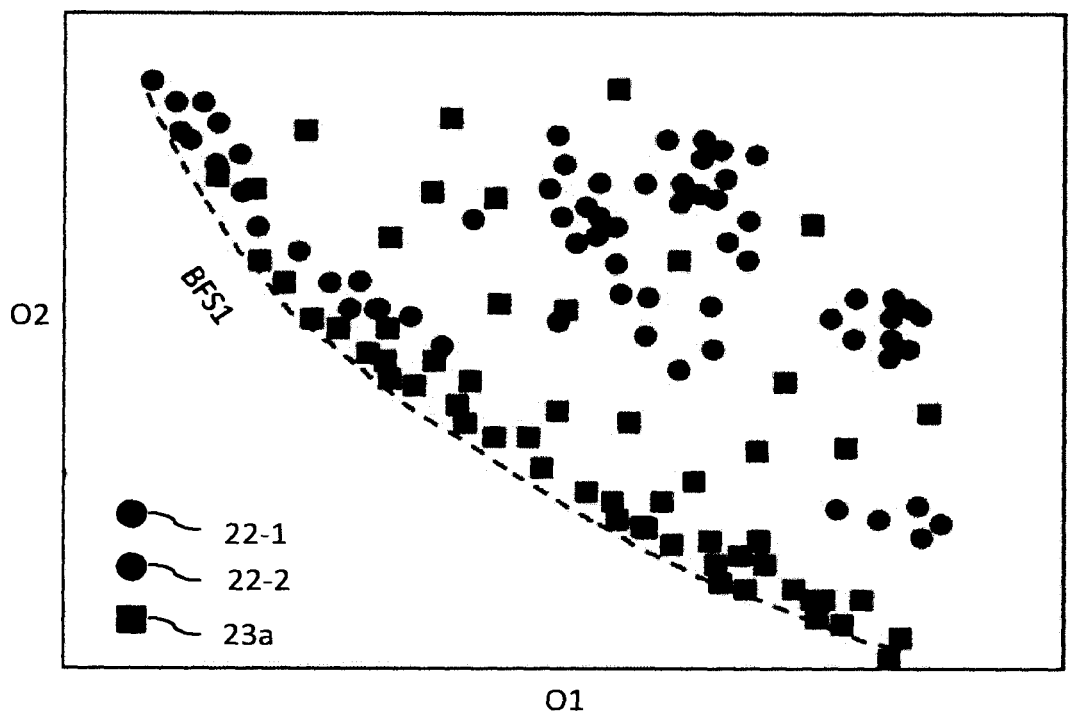
FIGS. 6A, 6B illustrate the pareto front examples in the objective space of a two-dimensional objective function for a respective blast furnace for visualization purposes.
Figure 6B:
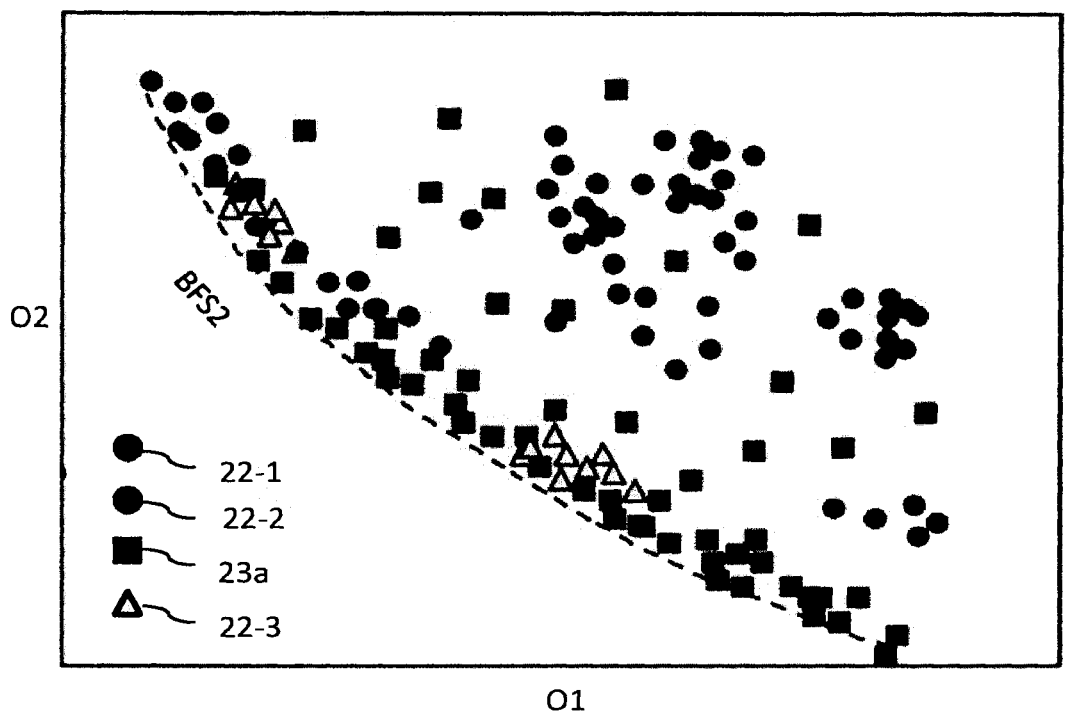

FIGS. 6A and 6B illustrate the pareto front (dashed line) in the objective space of a two-dimensional objective function (with two objectives O1, O2) for a respective blast furnace state BFS1, BFS2 (for visualization purposes). The RILM model needs to learn the optimal control instruction for the blast furnace, so that the associated objective measurement lies on the Pareto front. In these figures, the objective has been calculated for each historical and artificial data sample. The figures illustrate the limitation of historical data which is often limited to only a few operation modes of the blast furnace leading to clusters in the objective space. Thereby, the bullets of type 22-2 are associated with the domain invariant data set obtained from historical data. The squares of type 23a are associated with the domain invariant data set based on the artificial (simulated) data. The bullets of type 22-1 are associated with data generated by a deep generative model trained from historical data 21 (raw data) or 22 (domain invariant raw data). This deep generative model acts as an advanced interpolating algorithm providing new raw data generated from historical data. Therefore, generated data can only be relatively close to existing historical data. The generation of such data associated with type 23a is described in more detail in FIGS. 1 and 2. In FIG. 6B, the triangles of type 22-3 are associated with online data obtained during the operation of the blast furnace and used for the online training mode of RILM 130. The triangles of type 22-3 are naturally closer to the Pareto front as they are resulting from the trained model providing recommendations of optimized operating instruction (cf. predicting 1700 in FIG. 2). However, in order to optimize further the recommendation of operating instruction on those data, an online retraining of the RILM 130 is triggered.

In one embodiment, the system 100 may include a data augmentation module DA 140 to augment the operational raw data 21 measured by sensors on the blast furnace by using one or more specifically trained machine learning models ML1 to MLn for predicting information about the future thermal evolution of the blast furnace state, or any other information related to the present thermal state (example: process phenomena prediction, virtual sensor providing measurement at higher frequency than the actual sensor for example). Such predictions serve the same purpose as the raw data for training the RILM 130 model and are used in the same manner as the raw data 21 (historic operating data). An example of such a specifically trained machine learning model, is a model predicting the temperature of the hot metal in 3 h. This prediction of the temperature of the hot metal can then be used to train RILM 130. Such data augmentation further improves the training dataset used for the reinforcement training of RILM 130 and leads to an improved prediction accuracy of the reinforcement leaning model. Alternatively, new sensors may be added, as described in FIG. 9. This allows to more precisely characterize the state of the blast furnace for training RILM 130. As an example, if some characteristics of the raw material charged in the furnace are missing (e.g., porosity, humidity), they can either be measured (using additional sensors), or they can be potentially estimated using the machine learning models ML1 to MLn.

A list of machine learning models (ML) which are advantageous for data augmentation to allow a more precise characterization of the state of the blast furnace, and, as a consequence, allow a more precise training of RILM 130, is listed below:
a) ML for advanced data validation: any anomalies in the raw data provided by blast furnace sensors may be detected before training a machine learning model or may be used as input in production of a deployed machine learning model
b) ML for forecasting the thermal state of the blast furnace and hot metal production KPIs (key performance indicators)
c) ML for charging matrix optimization
d) ML for tuyere camera-based process inspection
e) ML for Tap Hole Opener recommendation for optimal operation
f) ML for TMT SOMA-based phenomena detection and KPI calculation/forecasting
g) ML for phenomena labelling by process rules (potentially using the output generated by a machine learning model) defined by the process engineer, or by supervised or unsupervised machine learning or pattern detection models
h) ML for phenomena forecasting from labels generated in g)
i) ML for process forecasting
j) ML for predictive and prescriptive maintenance
k) ML for advanced contextual representation learning: environmental sensors can be used to train an unsupervised deep learning model for learning representation used to augment the dataset for above mentioned required use cases.

Figure 7:
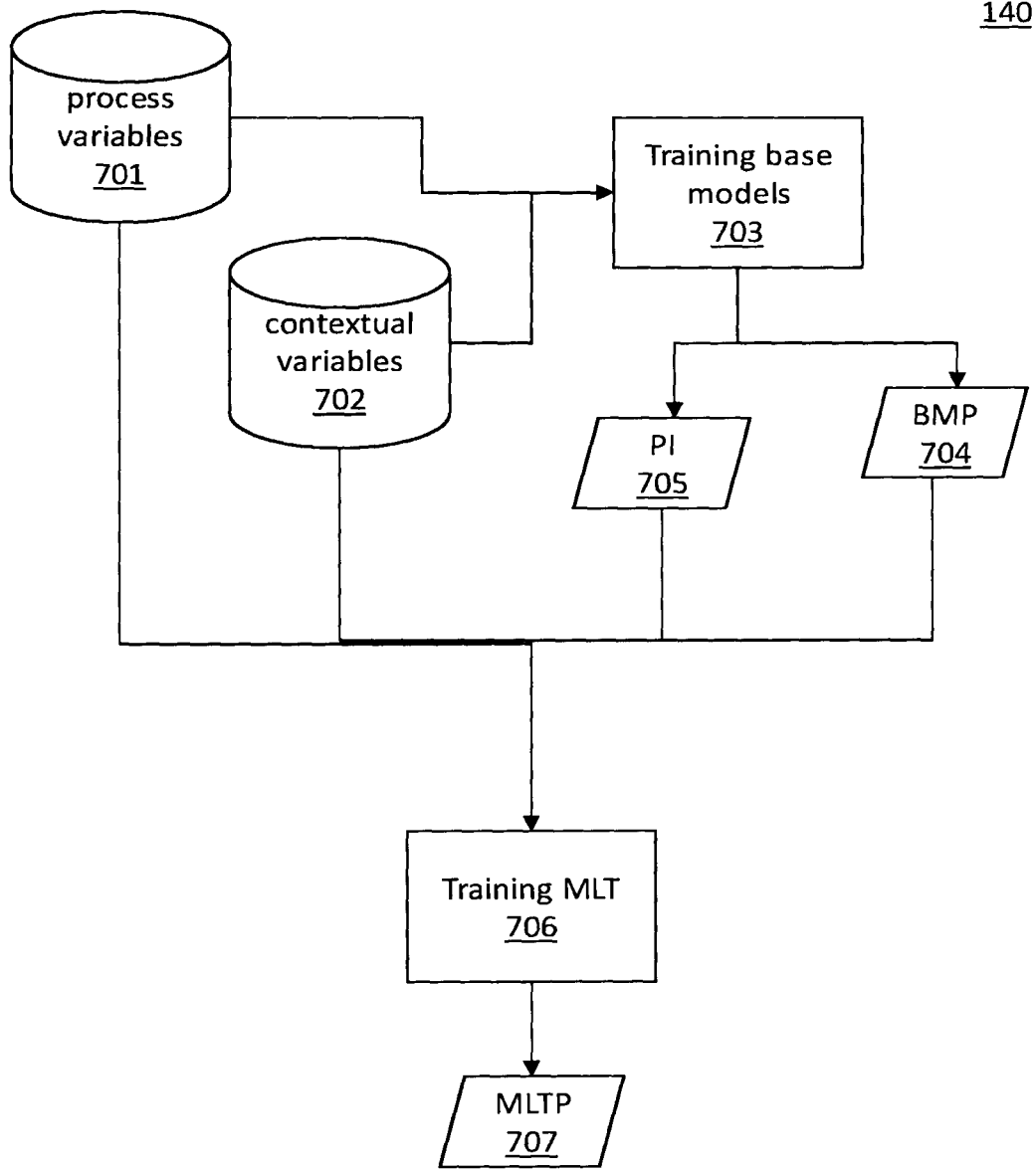
FIG. 7 illustrates the use of additional machine learning models for training data augmentation according to an embodiment.

FIG. 7 describes in more detail an approach to implement DA 140 for training a machine learning model to predict the temperature of the hot metal in 3 h. FIG. 7 illustrates a procedure to train 706 a machine learning model MLT to predict the temperature of the hot metal at a future point in time (e.g., in 3 h), from the predictions BMP 704 of multiple machine learning models-referred to as base models. The base models are trained 703 to generate predictions to augment the measured raw data.

For this purpose, the multiple base models are trained 703 with different selections of variables (process variables 701 and/or contextual variables 702), and/or machine learning algorithms. The process variables 701 are the raw data (operating data) measured by respective sensors directly on the blast furnace. Contextual variables 702 are measured by any other sensors measuring environmental variables like noise, images, etc. Process variables and contextual variables are variables which are available to train the machine learning models.

Each base model provides an output 704, 705 that can be used for training 706 MLT (in general, for training any machine learning model for predicting also other parameters than the temperature of the hot metal in 3 h) to make prediction of the parameter in question which is better than any prediction of the base models. The purpose of the base models is to generate additional information for training a more precise prediction model (i.e., a meta model such as MLT). The prediction model MLT also uses the process and contextual variables 701, 702 as input to learn which combination of base models is most appropriate for which state of the blast furnace. That is, the meta model is learning how to combine the outputs of all base models to make a more accurate and precise prediction of a particular blast furnace state parameter. Some base models may not predict the hot metal temperature in 3 h, but may predict a tendency of the hot metal temperature—for example, whether the temperature will be increasing, decreasing or stable, or they may predict the occurrence of a specific process event in the near future, etc. In other words, the base models generate as outputs additional information that is either related to the process (process information PI 705) or that is already a base model prediction BMP 704 for the hot metal temperature or a characteristic of the hot metal temperature (example: tendency prediction). Once MLT has been trained 706 based on the outputs of the various base models, it provides a more accurate prediction MLTP 705 than any of the base models (BMP 704).

In the example, the process information PI 705 may provide input information for MLT, such as feature predictions in the range [0, 6 h] including but not limited to cluster, process phenomena, process/contextual variable or features. Those outputs are related to the process and provide new input with potentially higher correlation to the hot metal temperature predicted by MLT. The base model predictions BMP 704 for the hot metal temperature may provide information such as the tendency of the hot metal temperature in 3 hours and 6 hours (e.g., high increase, medium increase, low increase, stable, low decrease, medium decrease, high decrease), or the predicted hot metal production quality during said time range. BMP 704 are outputs of the base models that are directly related to the output of MLT, either the same output or characteristics of it. An example for the same output is "hot metal temperature in 3 h" and an example of a characteristic of that output can be the "tendency of the temperature" predicted by the base model.

In the following, some examples of the above list of machine learning models are described in more detail.

Advanced data Validation:

A data validation pyramid can be defined by multiple data validation levels as described in the following, starting with the lowest level and ending with the highest level of the pyramid.

Sensors maintenance and calibration: A procedure for sensor maintenance and calibration may be implemented. Artificial Intelligence (AI) may be involved to optimally schedule maintenance actions and prescribe best actions to be performed to keep the sensors in operating mode as long as possible.

Process Min/Max on individual sensor signals: The first level of anomaly detection is the definition of minimum and maximum values allowed for each sensor signal of the raw data. The minimum and maximum values are constant and therefore independent of process operation. Condition based Process Min/Max values can be configured in rules defined by process experts in order to bring some context.

Outlier and anomaly detection on individual sensor signals: below typical methods are listed with increasing complexity:

i) Statistical amplitude outliers:

A data analytics method to detect point anomalies, being by definition a value shifted in amplitude from the average value within a moving temporal window of length L, to be specified by the process expert and based on typical self-correlation depth of the time series recorded by sensors.

ii) Supervised anomaly detection:

A supervised algorithm learns known patterns in the sensor signal in order to detect an anomaly.

iii) Unsupervised outlier detection:

Methods of this category are detecting outliers by applying a clustering algorithm after features are computed from the sensor signal. Therefore, such approach is not limited to unusual amplitude values for a given context, but can also take into account spectral information, or any other characteristics defined by the features.

Anomaly detection on multi-sensor signals: Due to a large number of sensors, manual cross checks between redundant sensor signals are not sufficient to detect complex contextual anomalies in the data. Rule-based approaches are usually limited because only known relations are validated. The same limitation holds for a supervised data-driven model that has been trained to detect known anomalies. An unsupervised data-driven approach, is a complementary validation step to ensure the detection of known and unknown anomalies. Contextual anomalies can be detected by a data-driven model that has learnt the correlation between sensor signals and, therefore, is able to detect if a sensor measurement is deviating from its normal operation in the given context as defined by the process. Causality discovery by machine learning combined with an unsupervised data-driven anomaly detection is enabling Root Cause Analysis.

Cross checks sensors vs. simulation models results: If a simulation model describing the process is available, a cross check of the model results with the raw data of the sensors provides an expert level autonomous data validation. This validation is however limited to the operation conditions inherent to the hypothesis of the simulation model.

The data validation pyramid is aiming at detection of anomalies in the received operating data (raw data). Anomalies can be related to faulty sensors but also to the process. In case of a process anomalies, rare process events can be properly labelled for the development of specific machine learning models, such as "Few-Shot Learning" (FSL) for their proper detection or forecasting. FSL is a known machine learning paradigm to learn from a limited number of examples with supervised information. A method aiming at differentiating a process anomaly from an anomaly related to faulty sensors, is root cause analysis. The analysis of the causal relation leading to the detection of an anomaly is able to classify anomalies into process or sensor related anomalies. To that end, a process engineer is defining rules or a machine learning model, and a semi-supervised classifier is trained from the causal relations and labels generated from above mentioned rules.

Blast Furnace Thermal State Forecasting:

This relates to the machine learning model MLT used by way of example in FIG. 7. MLT provides insight about the future of the thermal state of the blast furnace and the characteristics of the hot metal production. From the relevant process variables and other contextual variables which are useful to predict the thermal state of the blast furnace or the characteristics of the hot metal production, MLT is trained to forecast at a given time horizon, the following metrics:

Hot metal temperature tendency in 3 h and 6 h: high increase, medium increase, low increase, stable, low decrease, medium decrease, high decrease Hot metal Silicon content prediction at multiple time horizon ranging from the 1 h to 6 h in the future Hot metal quality at multiple time horizon ranging from the 1 h to 6 h in the future The model can be trained with hot metal temperature measured manually for each cast, or continuously in an autonomous manner by a dedicated sensor. An ensemble modelling approach may be implemented by combining the prediction of multiple base models as new input to train the meta model MLT resulting in a prediction having a reduced predictive bias or predictive variance.

Charging Matrix Optimization:

Burden Distribution is among the most important actuators available to operators to optimize gas utilization (etaCO) for minimizing coke rate and mitigating CO2 emissions. Burden distribution always needs to be adapted to blast furnace operation and is a compromise between optimum gas utilization, smooth burden descent and wall/stave (skinflow) temperatures.

As of today, some plants use Burden Distribution models to assess the effect of a given charging matrix on the burden profile and determine the C/(O+C) ratio across blast furnace throat diameter. This information is valuable and gives reasonably good hints about the temperature profile in the cohesive zone. Nevertheless, defining a charging matrix in a model is not straightforward and models only provide a limited help in finding the optimum charging matrix for a given operation.

A charging matrix is defined by the operator to distribute the material optimally on the blast furnace. To that end, a charging matrix includes parameters such as inclination of the chute and number of rotations for each material type. A machine learning model can be trained to predict the optimal charging matrix depending on the current thermal state of the furnace, its forecasted evolution, and its production KPIs. The charging matrix predictive model can be trained from the raw data of multiple blast furnaces if there is not enough variation of the charging matrix elements for a single blast furnace to train the machine learning model.

Figure 8:
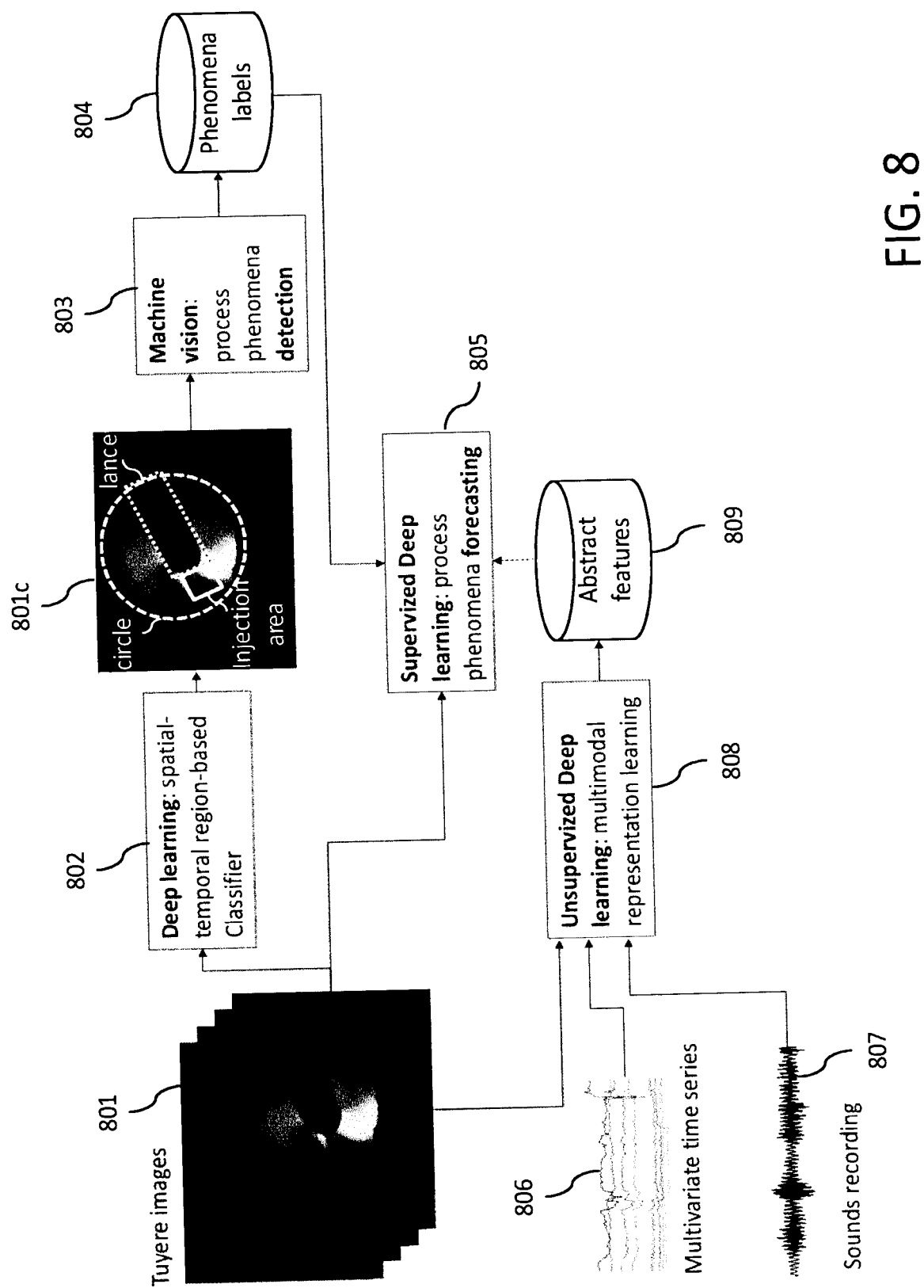
FIG. 8 illustrates the use of tuyere images for training data augmentation by using additional deep learning models according to an embodiment.

Tuyere Camera-Based Process Inspection:

This example relates to FIG. 8. Images 801 provided by a tuyere camera are analyzed by a combination of a Convolutional Neural Network (CNN) and computer vision 803 aiming at detecting phenomena 804 by applying computer vision on areas (e.g., circle, lance, injection area in the classified image 801c) detected by a CNN-based region classifier 802. Together with the tuyere images 801, the detected phenomena labels can then serve as input to a further deep learning model 805 trained to forecast process phenomena.

Another application of the tuyere image sequence analysis using machine learning is to encode spatio-temporal features to enrich the representation of the blast furnace state defining the environment for the reinforcement learning model. For that purpose, multimodal learning 808 can be used as a method for learning the representation 809 of the environment from heterogeneous data such as images 801, multivariate time series 806, and sounds 807. This allows for an advanced approach compared to unimodal machine learning making the assumption of mode independence.

Tap Hole Opener Recommendation for Optimal Operation:

The scheduling of the tapping as well as its parametrization (ex: clay type, etc) can be recommended by a machine learning model.

TMT SOMA-Based Phenomena Detection and KPI's Calculation:

The SOMA is an instrument for providing 2D information about the temperature distribution on the top of the blast furnace. The temperature map can be processed by a machine vision algorithm potentially combined with a machine learning model for predictive purposes. The processing pipeline as described in FIG. 8 for camera-based tuyere inspection can also be applied to SOMA.

Phenomena Labelling and Forecasting:

Generating labels for process phenomena ensures the creation of rich information to improve the learning of relations between actions and the environment of RILM 130. Labels can be generated by rules defined by a process engineer or by a pattern detection model trained on pattern selected in historical data by a process engineer. The occurrence of a pattern can be detected by an algorithm such as Dynamic Time Wrapping for univariate or multivariate time series data, or by the definition of features to train a respective machine learning model. In addition to providing high level contextual information to the RILM model, those labels can be used to train the machine learning model for detecting the occurrence of a combination of phenomena, or to forecast the occurrence of a single phenomenon or a combination of phenomena. Training a supervised machine learning model from generated labels requires that there are enough labels with enough variance.

Predictive and Prescriptive Maintenance:

Machine learning models can be trained to predict maintenance and recommend actions to be taken to postpone a maintenance, and as a consequence to extend the lifetime of the blast furnace or any assets related to the blast furnace. To that end, multiple approaches are known, such as applying supervised learning to predict "Remaining Useful Life", or "Time To Failure" of assets. Unsupervised learning models can be trained for detecting rare events and to cluster temporally a training dataset to be used for training a supervised model forecasting those rare events. A Root Cause Analysis of the predictions allows an autonomous system trained with the maintenance actions recorded from past maintenances, to prescribe the best-known actions in order to delay the maintenance.

Figure 9:
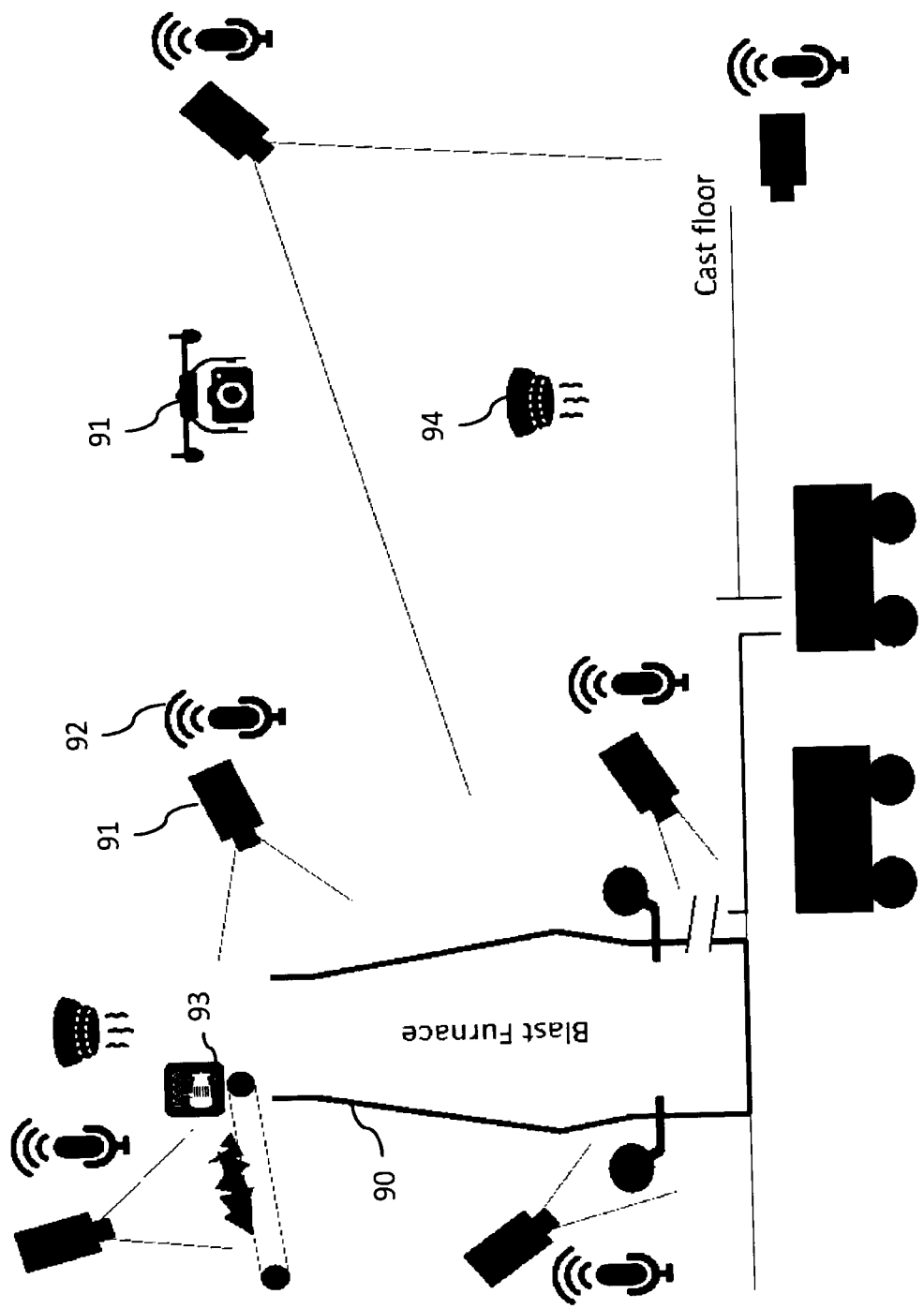
FIG. 9. Illustrates the use of additional sensors to characterize the state of a blast furnace for training the reinforcement learning model.

Advanced Contextual Representation Learning:

A reinforcement learning model needs a representation of the context in order to better model the environment and learn the optimal actions to take for that environment. To that end, multiple sensors may be developed and placed around the furnace 90 to record images (camera sensors 91), acoustic waves (sound sensors 92), vibration (vibration sensors 93), and to analyze the air (gas sensors 94) at different location as illustrated in FIG. 9. The respective multimodal time series can be analyzed by a deep learning network to extract a meaningful representation of the context, which can potentially be combined with process data of the blast furnace or material descriptive data. Material descriptive data correspond to the chemical analysis of the material, and other characteristics that may impact the thermal regulation of the blast furnace.

Figure 10:
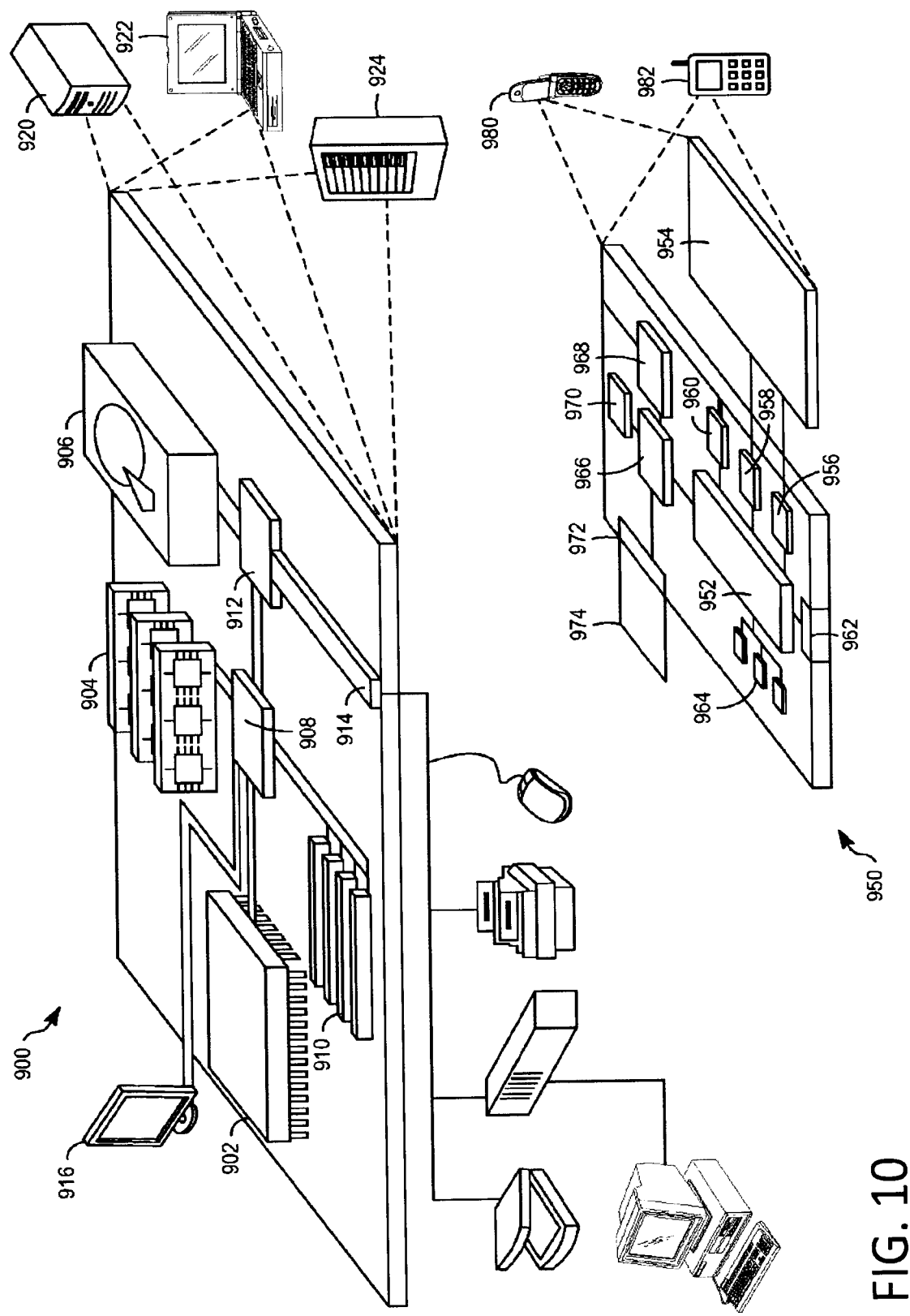
FIG. 10 is a diagram that shows an example of a generic computer device and a generic mobile computer device, which may be used with the techniques described here.

FIG. 10 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, driving assistance systems or board computers of vehicles (e.g., vehicles 401, 402, 403, cf. FIG. 1) and other similar computing devices. For example, computing device 950 may be used as a frontend by a user (e.g., an operator of a blast furnace) to interact with the computing device 900. The components shown here, their connections and relationships, and their functions, are meant to be exemplary only, and are not meant to limit implementations of the disclosures described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for training a reinforcement learning model to provide operating instructions for thermal control of a blast furnace, the method comprising:
processing, by a domain adaptation machine learning model trained by transfer learning, historical operating data obtained as multivariate time series and reflecting thermal states of respective blast furnaces of multiple domains, to generate a first domain invariant dataset representative of the thermal state of any of the blast furnaces irrespective of the domain;
generating artificial operating data as multivariate time series reflecting a thermal state of a generic blast furnace for a particular thermal control action by using a transient model of the generic blast furnace process, wherein the transient model reflects respective physical, chemical, thermal, and flow conditions of the generic blast furnace, and provides solutions for upward gas flow and downward moving of solid layers as structured in the generic blast furnace while exchanging heat, mass, and momentum transfer;
processing the artificial operating data by a generative deep learning network trained on multivariate time series of the historical operating data, to generate a second domain invariant dataset by transferring the features learned from the historical operating data to the artificial operating data;
the reinforcement learning model determining a reward for the particular thermal control action in view of a given objective function by processing the combined first and second domain invariant datasets; and
dependent on the reward, re-generating the second domain invariant data set based on modified parameters, wherein a genetic search and/or a Bayesian optimization algorithm is guiding the search for the modified parameters for a further thermal control action based on the current environment of the reinforcement learning model and the thermal control action output of the current learning step, and repeating the determining step to learn optimized operating instructions for optimized thermal control actions to be applied for respective operating states of one or more blast furnaces.

2. The method of claim 1, further comprising:
the reinforcement learning model predicting an optimized operating instruction for at least one actuator of a particular blast furnace in production based on a current operating state data of the particular blast furnace;
determining the reward after applying a thermal control action in accordance with the optimized operating instruction to the at least one actuator based on the new state of the particular blast furnace after execution of the thermal control action; and
if the reward is below a predefined threshold, regenerating, with the transient model, the second domain invariant data for one or more alternative operating instructions for re-training the reinforcement learning model.

3. The method of claim 1, wherein the domain adaptation machine learning model is implemented by a generative deep learning neural network with convolutional and/or recurrent layers trained to extract domain invariant features from the historical operating data as the first domain invariant dataset.

4. The method of claim 1, wherein the domain adaptation machine learning model has been trained to learn a plurality of mappings of corresponding raw data from the plurality of blast furnaces into a reference blast furnace, wherein each mapping is a representation of a transformation of the respective blast furnace into the reference blast furnace, and the plurality of mappings corresponds to the first domain invariant dataset.

5. The method of claim 4, wherein the domain adaptation machine learning model is implemented by a generative deep learning architecture based on the CycleGAN architecture.

6. The method of any claim 1, wherein the reinforcement learning model is trained to learn the optimized operating instructions so that an associated objective measurement lies within a predefined range from the Pareto front for a corresponding multi-dimensional objective function.

7. The method of claim 1, wherein the transient model comprises a plurality of computational cells with each cell representing a respective layer of the generic blast furnace composed of one charge of raw materials, with each computational cell solving gas phase equations in an iterative sequential way to satisfy relative gas phase parameter tolerances in each iteration time interval, and when the gas phase parameters converge to a predefined tolerance value, sequentially solving solid phase equations in the same iteration time interval.

8. The method of claim 7, wherein iteratively solving gas phase equations comprises for each iteration of a pressure-velocity correction loop:
calculating gas, solid and liquid properties;
calculating reaction rates and heat transfer coefficients;
calculating gas temperature, species, velocity, and pressure drop; and
wherein sequentially solving solid phase equations comprises:
calculating solid temperature and species;
calculating liquid temperature and species; and
calculating solid velocity.

9. The method of claim 1, wherein the transient model receives one or more of the following input parameters: burden materials amount and chemical analysis, temperature, pressure, PCI rate, and oxygen enrichment, with an energy equation to predict hot metal temperature, one or more species equations to calculate the hot metal chemical compositions, and one or more gas phase equations to predict top gas temperature, efficiency, and pressure.

10. The method of claim 1, wherein the reinforcement learning model is implemented by a recurrent neural network.

11. The method of claim 1, further comprising:
predicting information about the future thermal evolution of a particular blast furnace state based on the historical operating data and/or further measured environmental data related to the environment of the blast furnace, by using one or more respectively trained associated machine learning models to complement the historical operating data with future multivariate time series data which relate to future time points; and
processing, by the domain adaptation machine learning model, the future multivariate time series to augment the first domain invariant dataset with data that relates to future time points.

12. The method of claim 11, wherein training a particular one of the associated machine learning models comprises:

training a plurality of base models with different selections of operating data and/or environmental data using one or more machine learning algorithms to provide base model specific future multivariate time series data as training input to the particular one of the machine learning models;

training the particular one of the associated machine learning models with said base model specific future multivariate time series data to learn which combination of base models is most appropriate for which state of the blast furnace.

13. The method of claim 12, wherein the particular one of the machine learning models is trained to predict one of the following parameters at a future point in time: anomalies in the blast furnace process: thermal state of the blast furnace and hot metal production KPIs: charging matrix optimization: blast furnace phenomena based on tuyere camera-based process inspection: Tap Hole Opener recommendation for optimal operation: TMT SOMA-based phenomena and KPIs; phenomena based on phenomena labelling by process rules.

14. A non-transitory computer readable medium containing a program product that, when executed on a processor, performs the steps of the computer-implemented method according to claim 1.

15. A computer system comprising a processor configured to perform the steps of the computer-implemented method according to claim 1.

* * * * *